United States Patent [19]

Lafitte et al.

[11] 4,366,653

[45] Jan. 4, 1983

[54] LOCKING DEVICE FOR A CYLINDRICAL CAVITY

[75] Inventors: Raymond Lafitte, Lutry; Daniel Marchand, Lausanne; Claus Notheisen, Préverenges; René Walther, Lausanne, all of Switzerland

[73] Assignee: Bonnard & Gardel, Ingenieurs-Conseils SA, Lausanne, Switzerland

[21] Appl. No.: 114,691

[22] Filed: Jan. 23, 1980

[30] Foreign Application Priority Data

Feb. 1, 1979 [CH] Switzerland ............................ 954/79
Feb. 5, 1979 [CH] Switzerland .......................... 1079/79
Feb. 15, 1979 [CH] Switzerland .......................... 1469/79

[51] Int. Cl.³ .......................... E04H 7/20; E04C 3/10
[52] U.S. Cl. ...................................... 52/224; 52/245; 174/87
[58] Field of Search ...................... 174/38, 87; 52/224, 52/21, 245, 248

[56] References Cited

U.S. PATENT DOCUMENTS 3,568,379  3/1971  Johnsson et al. ........................ 52/21
3,701,227  10/1972  Lenschow ............................ 52/224
4,195,457  4/1980  Kissling et al. ........................ 52/248

FOREIGN PATENT DOCUMENTS 1354280  5/1974  United Kingdom .................. 52/224

Primary Examiner—James L. Ridgill, Jr.
Attorney, Agent, or Firm—Young & Thompson

[57] ABSTRACT

Cylindrical cavities of nuclear reactors and the like, containing a fluid under pressure, are closed by a plug consisting of a shell and a counter shell in prestressed condition.

6 Claims, 4 Drawing Figures

LOCKING DEVICE FOR A CYLINDRICAL CAVITY

The present invention relates to a removable locking device intended for sealing a cavity of which the walls are subjected to the temperature and the pressure of an inner fluid, such as, for example, an alveole of a reactor vessel, a tank or a cavity for storing gas.

The locking system must fulfill several conditions:

(a) it must resist pressure forces of the fluid and forces resulting from the deformation of the walls to which the locking is secured;

(b) it must be tight to the fluid contained in the cavity.

The present invention is characterized in that the plug is comprised of a shell and a counter-shell, the upper shell is supported by the walls of the cavity or by an independent ring in the radial direction and in that the supporting system, between the shell and the support structure, is comprised of tangential displacement blocks.

The device according to the invention aims at reducing the problems raised by the compatibility of the deformations between the plug and its supports, to simplify the blocking of the plug and to reduce the weight of the components of the plug to make maintenance easier.

The accompanying drawings represent, as an example, two embodiments of the invention provided for a cylindrical cavity of a prestressed concrete reactor caisson.

Figure 1:
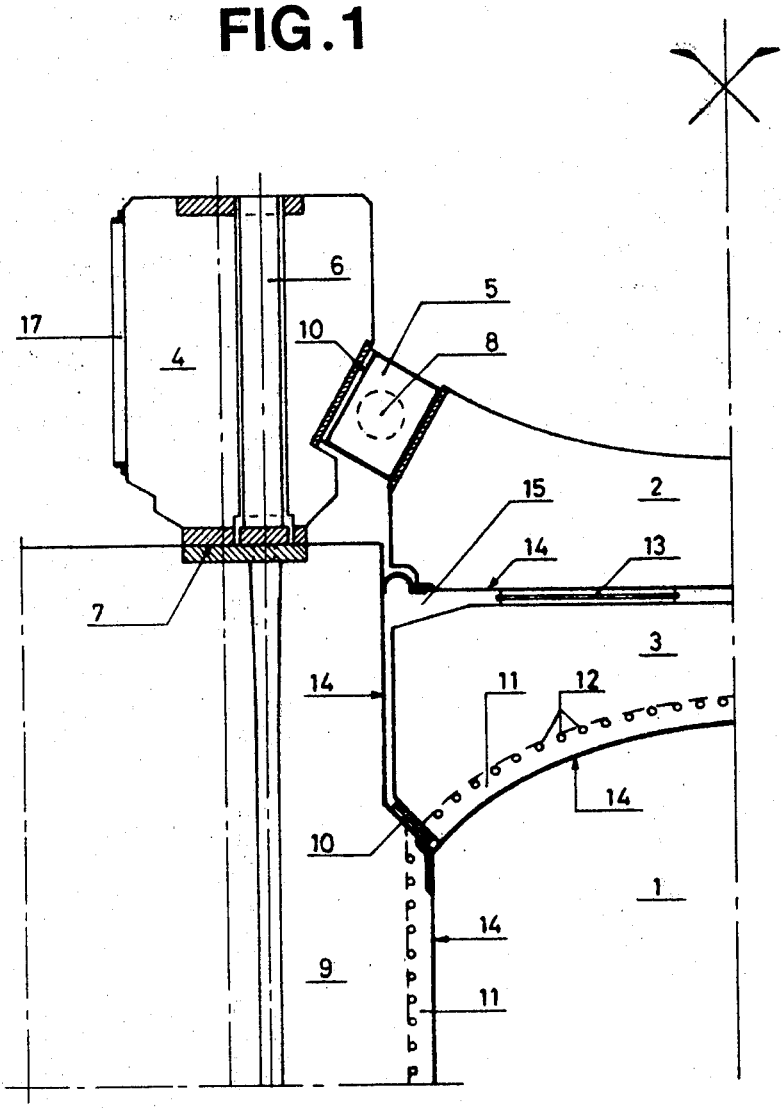
FIG. 1 is a vertical cross-section view taken along a radius of a first embodiment.
Figure 2:
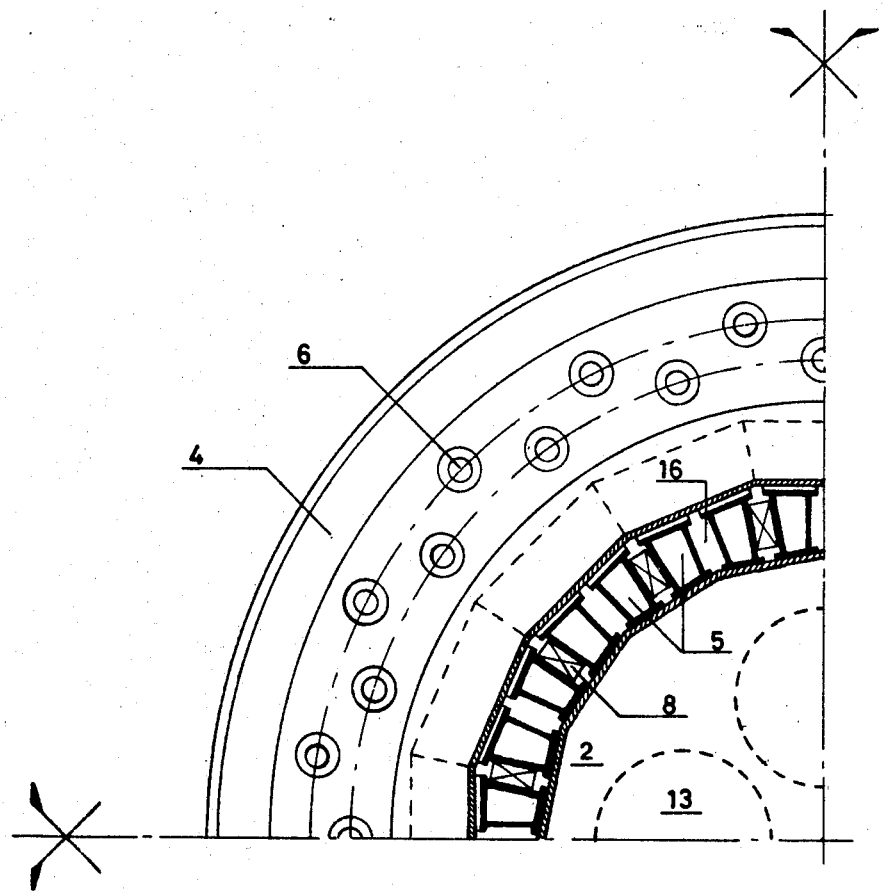
FIG. 2 is a fragmentary plan view of the embodiment of FIG. 1.

According to FIGS. 1 and 2, the cavity 1 is sealed by a shell 2 supported by a counter-shell 3. These two shells are made of reinforced concrete. The shell 2 transmits the pressure forces which act on it to a radially independent ring 4 through blocks 5. The ring is held by prestressed cables 6. The ring rests on a surface 7 allowing sliding (teflon, steel, etc). The blocks made of reinforced concrete or metal, may be annularly displaced by means of jacks 8.

The counter-shell 3 is directly supported by the walls of the cavity 9. A deformable material plate 10 compensates for the support reactions. The counter-shell comprises a layer of hot concrete 11 acting as a heat-insulator which, with a cooling system 12, keeps the reinforced concrete of the counter-shell at a permissible temperature.

Between the shell 2 and the counter-shell 3 flat jacks 13 are arranged to generate a prestress of the shells on their supports.

A steel sealing skin 14 is anchored in the walls of the cavity 9. This skin is applied on the inner face of the counter-shell 3. Further, it envelopes completely the counter-shell, forming a permanent depression zone 15 wherein possible gas leakage may be detected.

In FIG. 2, the supporting device of the shell 2 on the ring 4 is shown. This supporting device consists of prismatic shape blocks 5, which have a tangential displacement and are inserted in the space 16 provided between the plug and the ring. These blocks are pushed tangentially by jacks 8 so as to provide the liaison between the shell and the ring. It is possible, by said means, to adapt this supporting system to the relative deformations of the ring and the shell, to adjust the position of the shell and possibly, to introduce an initial prestress in the shell.

In case of disassembling, the jacks are displaced and inserted again between the blocks so as to unblock them. The advantage of the system lies in its simple construction and the facility for putting it in place.

It is thus possible to exert a prestress by means of blocks 5 pushed by the jacks 8 or by flat jacks 13. This prestress limits the movements of the plug when the cavity is pressurized. Further, the presence of the ring 4, independent of the caisson, limits the strain on the shell 2 due to the deformations of the caisson.

The sealing device, comprising a double skin, is controllable. It may be made of steel or polytetrafluoroethylene for example. The plug may withstand the dropping of heavy bodies. It may be made of concrete, iron or an appropriate alloy.

In the embodiment according to FIG. 1 and FIG. 2, the shell and the counter-shell bear the one on the other. Nevertheless, the invention is not limited to a shell and a counter-shell consisting of two distinct parts.

Figure 3:
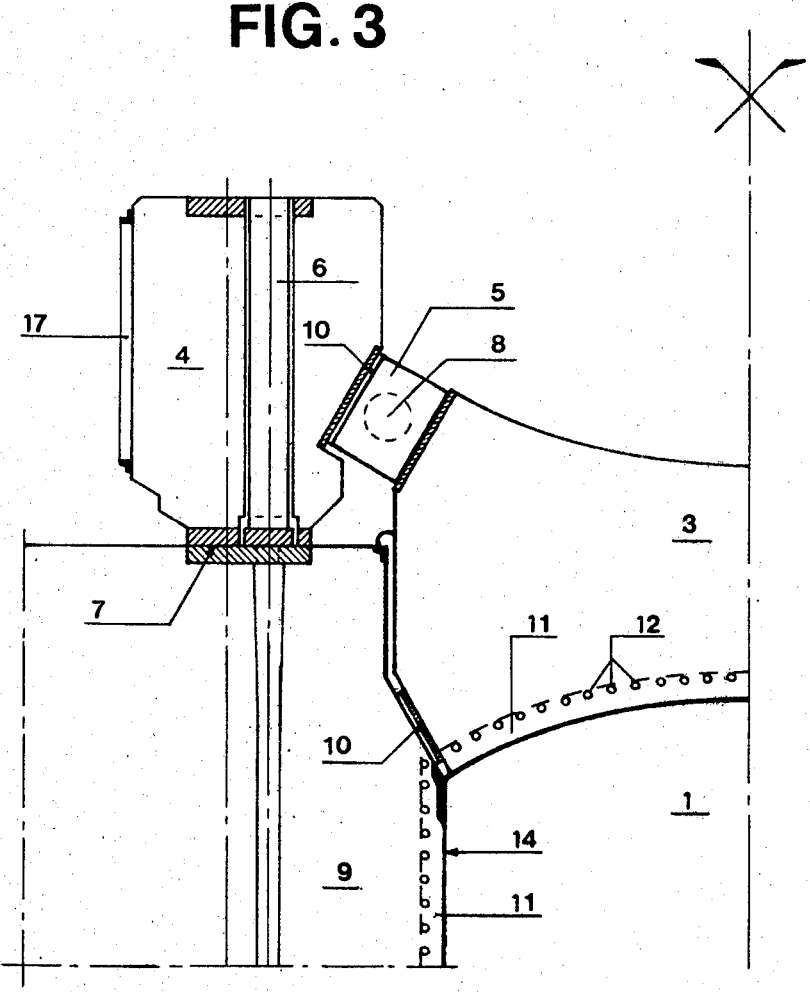
FIG. 3 is a cross-section view similar to that of FIG. 1 of the second embodiment.

FIG. 3 shows an embodiment, wherein the shell and the counter-shell are comprised of a single piece 3'. The other elements of this embodiment are identical to those of FIGS. 1 and 2 and therefore have the same reference numerals.

Figure 4:
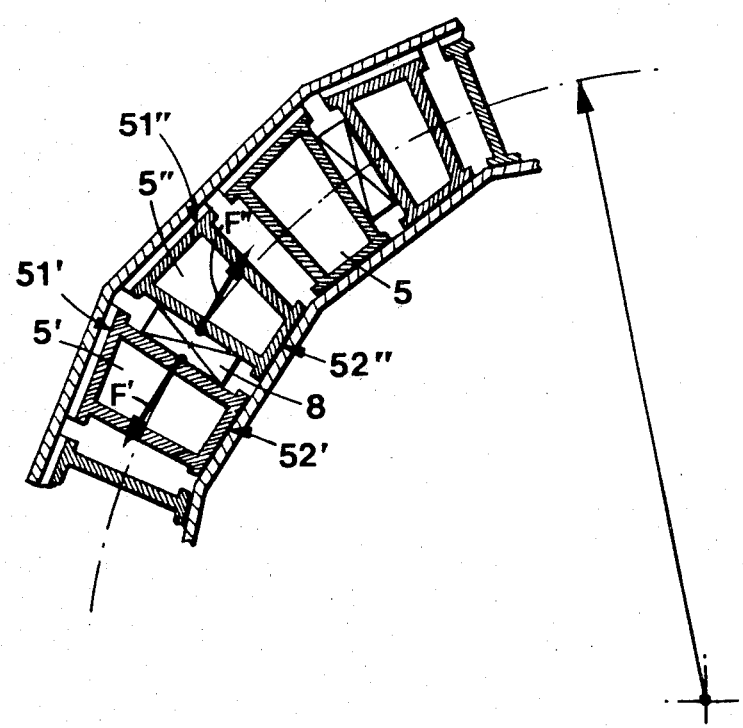
FIG. 4 is an enlarged fragmentary view of a portion of FIG. 2.

The wedges in the enlarged view of FIG. 4 are disposed in pairs 5' and 5", the jack 8 being provided between 5' and 5". The opposite faces 51' and 52', respectively 51" and 52", are inclined toward each other for providing the wedging effect. Thus, at least one face (51' or 52') is inclined with respect to the applied force (F' or F"). The opposite faces 51' and 52', or 51" and 52", transmit the wedging pressure to the support structure on one side and on the shell on the other side, which results in blocking the plug about the opening of the container.

In FIG. 4, the circle concentric to the opening, to which the forces F' and F" are tangent, is shown in phantom line.

We claim:

1. Container with an opening and a removable locking closure, for a fluid under pressure, comprising a shell and a countershell forming together a plug and, between the shell and a support structure connected to the container, wedges provided as prismatic blocks, means exerting a force on each said wedge, the direction of the said force being tangent to a circle concentric to the opening, each wedge having two opposite faces in contact respectively with the said support structure and the shell, at least one of said faces being inclined with respect to the direction of the said force, for producing a wedging effect to secure the plug on the container.

2. Container according to claim 1, wherein the shell bears on a ring independent of the walls of the container.

3. Container according to claim 1, comprising a sealing skin enveloping the countershell for controlling gas leakage.

4. Container according to claim 1, wherein the blocks are moved tangentially in either direction by jacks.

5. Container according to claim 1, wherein the shell and the countershell are made in one piece.

6. Container according to claim 1, there being a plurality of jacks spaced about the periphery of said plug, there being a said block on each peripheral side of each said jack, each said jack moving two adjacent blocks simultaneously toward or away from each other thereby respectively to release or to exert the wedging action of said blocks between said plug and said support structure.

* * * * *